US007381057B2

(12) United States Patent
Frank

(10) Patent No.: US 7,381,057 B2
(45) Date of Patent: Jun. 3, 2008

(54) DRAWING APPARATUS, METHOD OF USE AND RESULTANT ART

(76) Inventor: Phil J Frank, 7361 Heatherhill Ct., Bethesda, MD (US) 20817

( * ) Notice: Subject to any disclaimer, the term of this patent is extended or adjusted under 35 U.S.C. 154(b) by 572 days.

(21) Appl. No.: 10/954,024

(22) Filed: Sep. 30, 2004

(65) Prior Publication Data

US 2005/0223929 A1 Oct. 13, 2005

Related U.S. Application Data

(60) Provisional application No. 60/506,895, filed on Sep. 30, 2003.

(51) Int. Cl.
*G09B 11/10* (2006.01)

(52) U.S. Cl. .................................................. 434/84

(58) Field of Classification Search .................. 434/81, 434/84, 85, 87, 88, 98; 156/62

See application file for complete search history.

(56) References Cited

U.S. PATENT DOCUMENTS

| | | | | |
|---|---|---|---|---|
| 1,219,903 | A | 3/1917 | Andrews | |
| 2,811,800 | A * | 11/1957 | Gesek | 156/62 |
| 4,279,674 | A * | 7/1981 | Wadden | 156/62 |
| 4,382,819 | A * | 5/1983 | Berghofer | 523/427 |
| 4,584,042 | A * | 4/1986 | Wandroik | 156/280 |
| 4,992,120 | A | 2/1991 | Badura | |
| 5,089,351 | A | 2/1992 | Baarns | |
| 5,196,237 | A * | 3/1993 | May | 427/288 |
| 5,654,016 | A * | 8/1997 | Shell | 425/87 |
| 6,045,592 | A * | 4/2000 | Paquin | 8/516 |
| 6,821,303 | B2 * | 11/2004 | Polsky | 8/447 |

* cited by examiner

*Primary Examiner*—Kurt Fernstrom
(74) *Attorney, Agent, or Firm*—Berenato, White & Stavish

(57) ABSTRACT

A drawing apparatus and an associated method that allows selective heating of a substrate when a colorant, such as a crayon, is applied to the substrate. The heated substrate at least partially liquefies the colorant. The colorant is then absorbed into the substrate to create a translucent image on the substrate. When the colorant is removed from the substrate, the substrate correspondingly disengages from a heat source and the image formed on the substrate cools and hardens.

18 Claims, 3 Drawing Sheets

DRAWING APPARATUS, METHOD OF USE AND RESULTANT ART

CROSS-REFERENCE TO RELATED APPLICATIONS AND CLAIM TO PRIORITY

This application is a non-provisional application of provisional patent application No. 60/506,895, filed Sep. 30, 2003, the disclosure of which is incorporated herein by reference and priority to which is claimed under 35 U.S.C. § 120.

FIELD OF THE INVENTION

The invention relates to a method and apparatus for creating a drawing. Specifically, the invention relates to a method and apparatus for creating a drawing by bringing a substrate into contact with a heating source and thereby heating the substrate so that a colorant, such as a crayon, is liquefied and thereby saturates or forms on the substrate, so that upon removal of the substrate from the source of heat the colorant may solidify.

BACKGROUND OF THE INVENTION

Many different types of drawing media have been used throughout the ages. Each type of drawing media has its distinct advantages as well as disadvantages.

Water color paints allow colors to be blended during the application process and provide a certain degree of transparency when applied over pencil, charcoal and the like. However, water color paints are simply not capable of producing a picture that is radiantly translucent with vibrant coloring. Furthermore, pictures made using water color paints are highly susceptible to irreversible damage from even small amounts of liquid.

Oil and acrylic paint are capable of providing an intense coloration and a texture to the painted surface of a picture, such as that shown in the paintings by Vincent Van Gogh. However, the paints are opaque, can be very expensive, and require a lengthy time to dry.

Oil pastels can be blended, but do not saturate the substrate to create radiantly translucent vibrant images. Furthermore, they have the significant drawback of being highly susceptible to smudging.

Crayons can also be used for drawing, but have several drawbacks, including their inability to saturate a substrate with color. Invariably, the color-coverage is sketchy, with fibers of the substrate showing through. Even repeated, time-consuming strokes of the crayon leave ragged edges. Furthermore, normal crayon application simply does not permit a true color blending to be achieved. Even though different crayon colors can be overlapped and interlaced, the different crayon colors cannot and are not blended.

Prior color-applying techniques are relatively complex and involve processes that are difficult to control and frequently produce smudged and inferior drawings. The need exists for a simple apparatus and process that allows a user to intuitively create works of art, especially translucent works, using inexpensive, readily available colorants, such as crayons. The present invention enables a first-time user to easily produce works of art that are translucent and unique. Through the process described in the present invention, color is imparted in an easily controlled and instantly "dry" manner. Even long after the colors have "hardened", the artist can return to a work, and using the apparatus of the present invention, blend in new colors, add layers, or add new drawings

SUMMARY OF THE INVENTION

The present invention is a drawing assembly comprising a heat source juxtaposed with a substrate elevator. The substrate elevator is adapted to be moved toward and away from the heat source. A substrate cooperates with the substrate elevator and moves correspondingly toward and away from the heat source so that heat is transmitted from the heat source to the substrate when the substrate is proximate the heat source. Applying a colorant to the substrate partially liquefies the colorant and colors the substrate. When the substrate is removed from the heat source, the colorant is allowed to harden.

The present invention also includes a drawing assembly comprised of a platform with at least one adjustable hand rest. A heat source with an adjustable temperature setting is recessed within the platform. Illuminating devices surround and outline the heat source. A flexible and resilient substrate elevator is suspended opposite the heat source so that the substrate elevator is selectively engageable with the heat source. A substrate cooperates with the substrate elevator for corresponding engagement and disengagement with the heat source through the substrate elevator. A colorant is operatively associated with the substrate. Applying the colorant to the substrate causes the substrate to engage the heat source so that the colorant is at least partially liquefied and absorbed into the substrate thereby causing the colorant to become integral with the fibers of the substrate and creating a translucent image on the substrate.

The present invention further includes a platform for selectively heating and coloring a substrate. The platform comprises a heated plate for heating a substrate. A flexible substrate elevator is sandwiched between the heated plate and the substrate so that the substrate elevator and the substrate selectively engage and disengage from the heated plate. Applying a colorant to the substrate causes the substrate and substrate elevator to engage the heated plate and least partially liquefies the colorant, thereby causing liquefied colorant to be absorbed into the substrate.

The present invention also includes a method of making a drawing. The method comprises positioning a substrate elevator adjacent to a heated surface so that the heat from the heated surface is transmitted to and thereby heats a substrate. A colorant is applied to the substrate so that the colorant at least partially melts and thereby colors the substrate and causes a translucent coloration of the substrate. The substrate is then removed from the heated surface and the colorant is allowed to cool and harden.

DETAILED DESCRIPTION OF THE INVENTION

Figure 1:
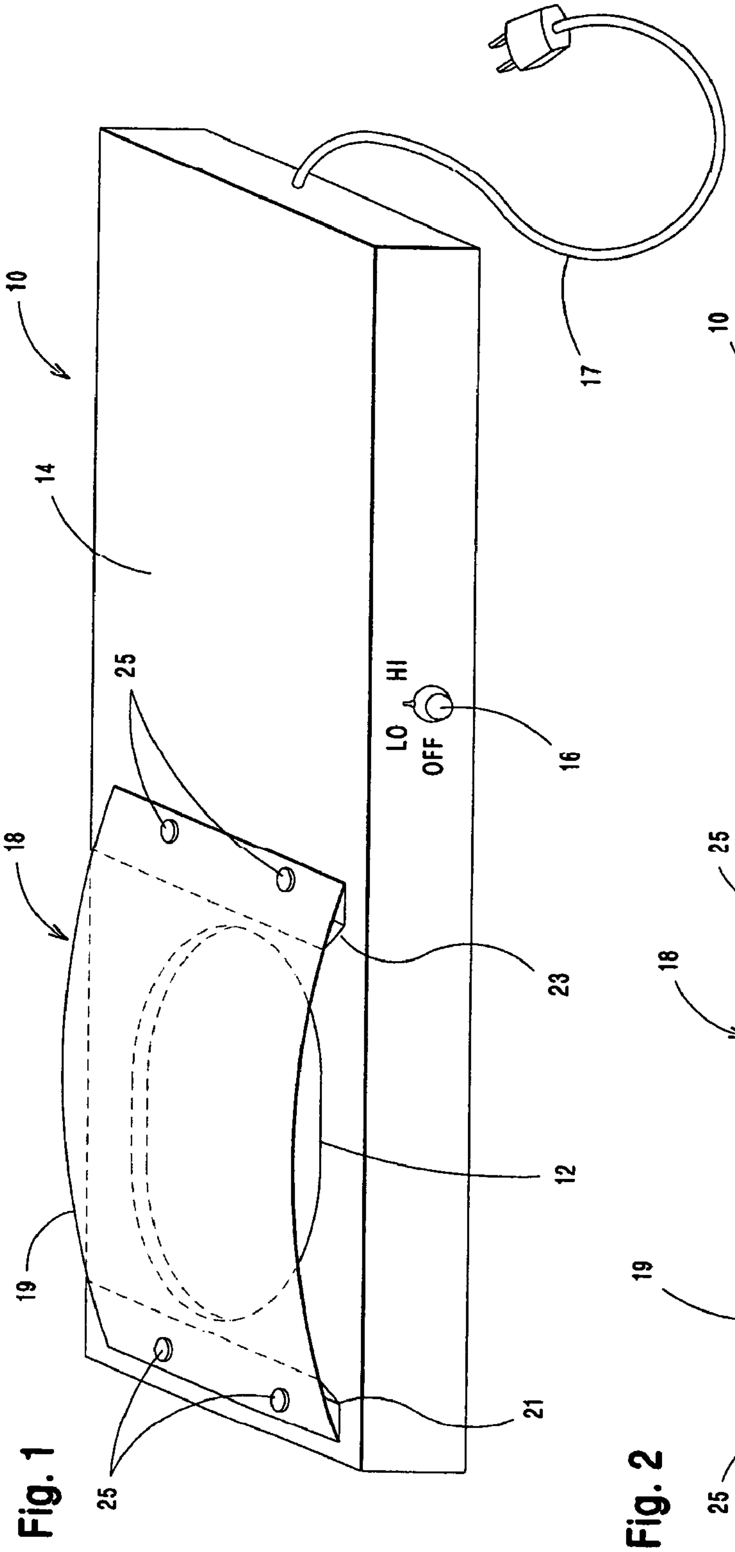
FIG. 1 is a perspective view of the present invention.

As best shown in FIG. 1, in a preferred embodiment, the invention comprises a platform 10 that includes a heat source 12 for heating a selected area of the platform. The heat source 12 may be recessed into the platform, and the platform 10 may include a fixed hand rest 14. The heat generated by the heat source 12 may be automatically controlled by a thermostat or manually controlled through a heat adjustment mechanism 16.

Figure 2:
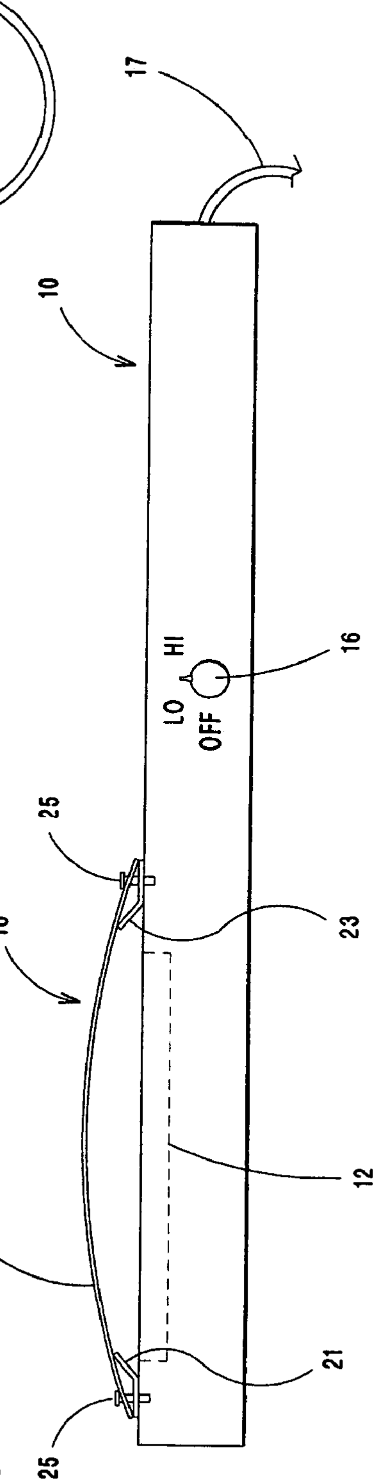
FIG. 2 is a side elevational view of the present invention with the heating source shown in dashed lines.
Figure 3:
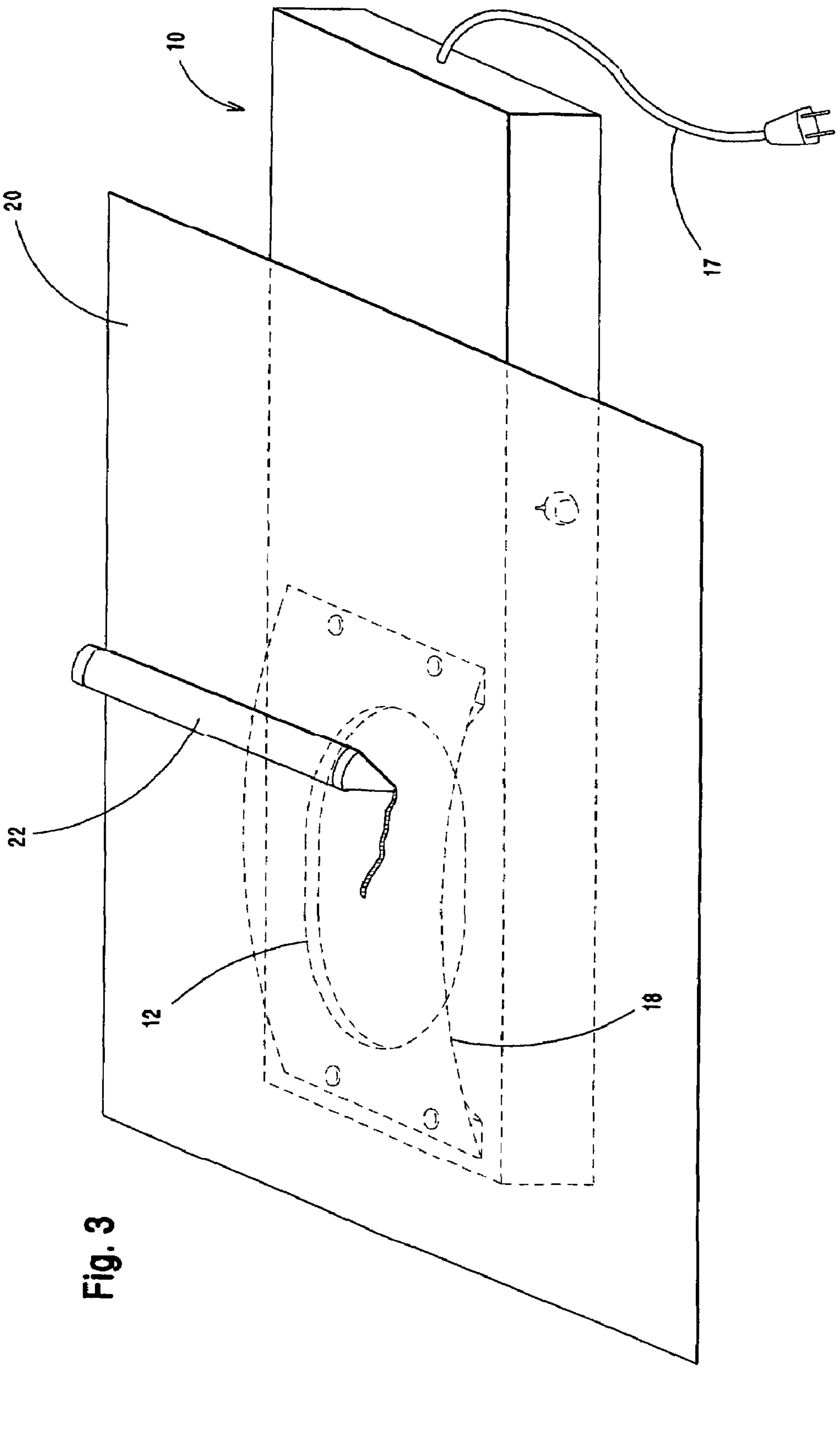
FIG. 3 is a perspective view of the present invention showing the substrate as a colorant draws on the surface of the substrate. A heat source and substrate elevator are shown in dashed lines.

The heat source may generate heat by any suitable means known to one skilled in the art. The heat source may include a low wattage ceramic heater, electric heating coil and the like. As best shown in FIGS. 1-3, power may be supplied to the heat source through a conventional electrical power cord 17. However, other means of supplying power to the heat source should be considered within the scope of the invention, including batteries, solar power and the like.

As best shown in FIGS. 1 and 2, a substrate elevator 18 includes film 19 and spaced biasing strips 21,23 and is positioned over the heat source 12. In the preferred embodiment, the film 19 is comprised of a flexible and resilient transparent or translucent material, preferably extruded polycarbonate. The film 19 preferably is extruded polycarbonate because it has good thermal conductivity, is able to withstand the heat from heat source 12, and has good mechanical properties to withstand repeated flexing of the film 19 during use of the invention.

The strips 21,23 are angled or bent plastic and underlie the film 19. The strips 21,23 bias the film 19 upwardly away from heat source 12. The film 19 is biased by bias strips 21, 23 to a position that is a fraction of an inch from the heat source 12. Rivets 25 or some other fastener, such as an adhesive, attach film 19 and biasing strips 21,23 to the platform 10. The film 19 has a length exceeding the distance between the rivets 25 attaching strips 21 and 23, respectively, so that the film 19 has a convex configuration relative to platform 10 and thereby further is biased away from heat source 12. By pressing down on the film 19, a user can selectively bring the film 19 into contact with the heat source 12. When pressure is released from the film 19, the substrate elevator 18 returns the film 19 to a position suspended over the heat source 12. The strips 21,23 preferably extend in parallel along opposite sides of heat source 12.

As best shown in FIG. 3, in operation, a substrate 20 is placed on film 19 over the heat source 12. Pressure is applied to the substrate 20 by a colorant 22, preferably a crayon. The pressure from the colorant 22 on the substrate 20 causes the film 19 to move downwardly and engage the heat source 12. Heat from the heat source 12 is transmitted through the film 19 to the substrate 20. The heated substrate 20 heats the colorant 22 and causes the wax in the colorant 22 to liquefy and melt. The wax from the colorant 22 is absorbed into the substrate 20. The liquefied colorant wax is absorbed into the substrate 20 rather than coated on top of the substrate 20 as occurs typically with crayons. Light readily passes through a substrate 20 colored according to the present invention which creates a translucent coloration of the substrate 20. When the colorant 22 is withdrawn from the substrate 20, the film 19 retracts and disengages the substrate 20 from the heat source 12. When the heat is removed from the substrate 20, the colorant wax saturating the substrate 20 cools and hardens.

The process described above allows the selective heating of a substrate 20 only during the exact time and at the exact location on the substrate 20 that a colorant is 22 applied.

This process allows a user greater control of the drawing and prevents smudges, drips, and runs. Because the wax in the colorant 22 melts as the colorant 22 is applied to the substrate 20, the colorant 22 glides across the substrate 20 with effortless strokes. Color is imparted in an easily controlled manner and almost instantly dries when the substrate elevator 18 retracts the film 19 from the heating source 12. Even long after the colors have "hardened" a user can return to a previously decorated substrate 20 and blend new colors, add layers, and add new drawings. Additionally, once heat source 12 has reached its operating temperature, the colorant melts almost instantaneously, thereby permitting colorant to be quickly applied to substrate 20. The user may use the same colorant at a different location or may apply a different colorant, which likewise melts almost instantaneously, to the same or a different location on substrate 20. The process thus is quite interactive and the user can essentially immediately observe the details of the artwork being created.

Figure 4:
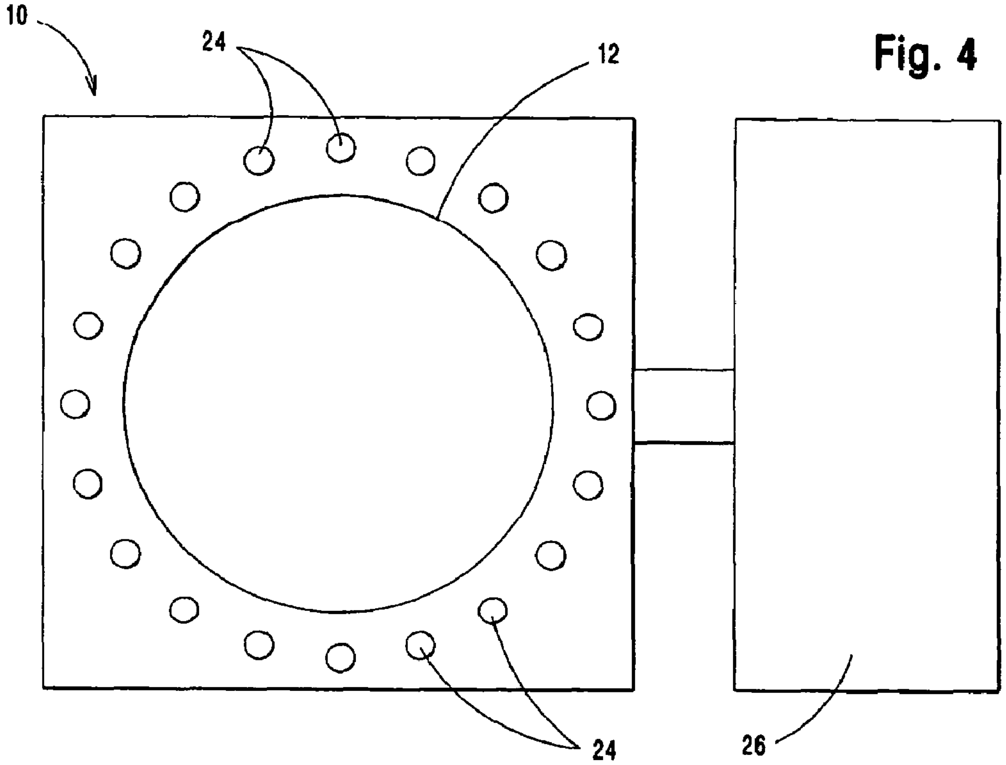
FIG. 4 is a top plan view of an alternative embodiment of the present invention.

As best shown in FIG. 4, in an alternative embodiment, an optical heating platform guide can be used. This optical heating platform guide causes beams of light generated by illuminating devices 24, such as provided by light emitting diodes, to shine through the substrate 20, demarking the heat source 12. This helps the user position the desired area of the substrate 20 directly above the heating source 12.

In a further embodiment of the invention, an adjustable hand rest 26 is supplied to provide an adjustable resting spot for a user's hand while in close proximity to the heat source 12. The hand rest 26 is maintained at a temperature suitable for direct skin contact. In an additional embodiment, the hand rest can be supplied as a separate item or can be made to pivot or slide out from the side of the heating platform, thus allowing a more compact device and also providing for adjustments for users of different sizes.

The material comprising the substrate 20 is preferably a relatively smooth surface capable of having the melted colorant medium (e.g. crayon) adhere to it and may include any suitable material known to one skilled in the art including paper, linen, fabric, plastic, fiberglass, parchment, animal skin, and the like. Although a flexible material is preferred, a rigid substrate, such as glass, may also be used provided that it can be raised and lowered by the substrate elevator 18.

The colorant or drawing medium 22 is any suitable medium that is capable of being softened or melted at a temperature below the temperature at which the substrate 20 is adversely affected, such as by softening, melting, charring, or ignition. As described above, in a preferred embodiment of the invention, the colorant 22 is a crayon or crayons. In further embodiments of the invention, the colorant 22 can further comprise imbedded sparkles, metallic or other particles, flakes or strands, and/or scented medium that provides aroma therapy while drawing.

In the present method of the invention, a suitable colorant 22, such as colored wax based crayons, are used to color the substrate 20. As the user colors, the substrate 20 is pushed downwardly through the action of pressing the colorant medium or crayon 22 on the substrate 20 so as to place the film 19 into contact with the heat source 12 at the point of contact with the crayon 22. In an alternative embodiment of the invention, the heat from the heat source 12 heats the substrate 20 to a temperature that causes an already deposited colorant drawing medium, such as crayon wax, to be melted to a sufficient extent so as to allow the melted drawing medium, such as crayon wax, to flow along the substrate 20 for limited distances so as to allow the blending of the colors in adjacent portions of the design. In another alternative embodiment of the invention, the heat source 12 heats the substrate 20 to a temperature that causes the already deposited drawing medium, such as crayon wax, to be melted to a sufficient extent so as to allow its color and texture to immediately and selectively blend with the new drawing medium, as the new drawing medium is applied.

Heat source 12 must be able to heat the substrate 20 and the colorant 22 to a temperature of at least the melting temperature of colorant 22. The heat source 12 preferably does not generate sufficient heat to char, burn or otherwise cause destruction of substrate 20.

As each section of a piece of artwork is colored, the crayon 22 is lifted, allowing the film 19 to raise the substrate 20 from the heat source 12 so that the melted crayon cools. Where the substrate 20 is an absorbent material, such as paper, some or all of the colorant 22 will penetrate the surface of the substrate 20 and saturate the substrate 20, rendering the colored substrate 20 translucent. For non-absorbent or less absorbent substrates 20, some or all of the colorant 22 will be deposited on the surface of the substrate 20. The artwork made using the apparatus and method of the present invention renders jewel like tones and allows the blending of colors from different colored crayons and different types of crayons, such as those containing sparkles to those not containing sparkles.

Figure 5:
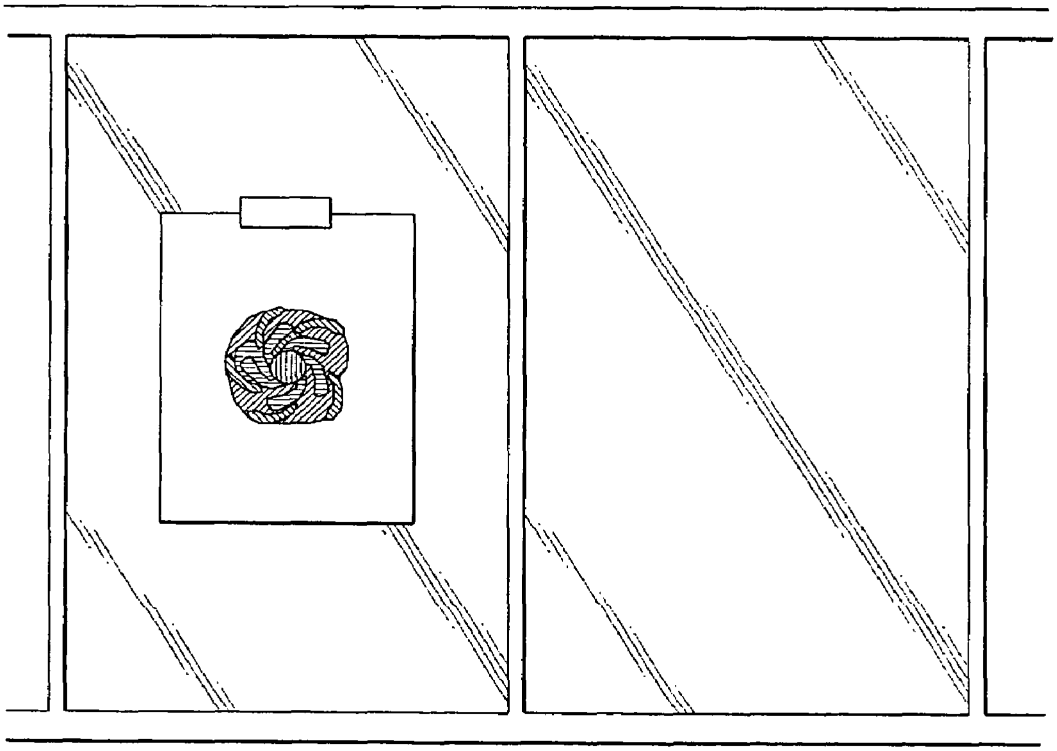
FIG. 5 shows artwork created by the method and apparatus of the present invention.

The artwork possesses an incredible degree of transparency that renders it particularly suitable for use as radiant sun-catchers for window decoration, wraps for votive candles, rear lighted clear picture frames, overlays for faux stained glass, radiant lamp shades, and the like. A drawing on substrate 20 and made according to the present invention and is shown in FIG. 5 and is displayed as a sun-catcher.

The method of the present invention results in a product having highly pleasing and dramatic characteristics and also such method readily lends itself to use by relatively unskilled users.

In still further embodiments of the present invention, a pre-imprinted substrate can be used so as to allow for a "color by number" system.

In additional embodiments of the present invention, stenciling can be achieved by placing thin, insulating templates on top of the heated surface, (below the substrate). These templates would prevent the drawing medium from melting on the substrate in certain areas, and allow it to melt in the desirable areas. This would allow users to produce precisely formed shapes, letters, pictures, etc.

In yet further embodiments of the present invention, the apparatus can be supplied in the form of a kit that can include suitable substrates and/or selection of drawing medium.

It is understood that while various preferred designs have been used to describe this invention, the invention is not limited to the illustrated and described features. Modifications, usages and/or adaptations following the general principles disclosed herein are included in the present invention, including such departures that come within known or customary practice in the art to which this invention pertains. The present invention is intended to encompass all such departures having the central features set forth above, without departing from the scope and spirit of the invention, and which fall within the scope of the appended claims.

I claim:

1. A drawing assembly comprising:

a source of heat, a substrate elevator juxtaposed to said source and adapted to be moved toward and away from said source, and a substrate cooperating with said substrate elevator for corresponding movement toward and away from said source so that heat is transmitted from said source to said substrate when said substrate is proximate said source, applying a colorant to said substrate at least partially liquefies the colorant and colors said substrate, when said substrate is removed from said source the colorant is allowed to cool and harden.

2. The drawing assembly of claim 1 wherein said source is recessed in a platform.

3. The drawing assembly of claim 2 wherein said substrate elevator is connected to a surface of said platform and suspended opposite said source.

4. The drawing assembly of claim 1 wherein said substrate elevator includes a film and at least a first biasing member biasing said film away from said source of heat.

5. The drawing assembly of claim 4 wherein there are at least two biasing members, each biasing member disposed along an opposite side of said source of heat.

6. The drawing assembly of claim 5, wherein said biasing members extend in parallel.

7. The drawing assembly of claim 6 wherein said substrate elevator is comprised of polymer materials.

8. The drawing assembly of claim 7 wherein said substrate elevator is comprised of extruded polycarbonate.

9. The drawing assembly of claim 2 wherein said platform further comprises illuminating devices disposed on said platform.

10. The drawing assembly of claim 9 wherein said illuminating devices surround said source.

11. The drawing assembly of claim 2 wherein said platform includes a handrest.

12. The drawing assembly of claim 11 wherein said handrest is adjustable.

13. The drawing assembly of claim 12 wherein said handrest one of pivots from or slides out from a side of said platform.

14. The drawing assembly of claim 1 wherein said source is adjustable to control heat transmitted to said substrate.

15. The drawing assembly of claim 1 wherein said substrate is comprised of a material selected from a group consisting of paper, plastic, glass, animal skin, cloth, fiberglass, glass, parchment, silk, and composite materials.

16. The assembly of claim 1 wherein the liquefied colorant is absorbed by said substrate so that the colorant is integral with said substrate and thereby creates a translucent image on said substrate.

17. A drawing assembly comprising:

a platform, an adjustable handrest operatively associated with said platform, a heat source having an adjustable temperature setting, said source being recessed within said platform, illuminating devices disposed within said platform, said illuminating devices surrounding said source, a flexible and resilient substrate elevator suspended opposite said source, said substrate elevator being adapted to selectively engage and disengage said source, a substrate cooperating with said substrate elevator for corresponding engagement and disengagement with said source through said substrate elevator, a colorant operatively associated with said substrate, wherein applying said colorant to said substrate causes said substrate to engage said source so that said colorant is at least partially liquefied and absorbed by said substrate thereby causing said colorant to become integral with fibers of said substrate and creating a translucent image on said substrate.

18. A platform for selectively heating and coloring a substrate, said platform comprising:

a heated plate for heating a substrate, a flexible substrate elevator sandwiched between the substrate and said heated plate, said substrate elevator and the substrate selectively engaging and disengaging from said heated plate, so that applying a colorant to the substrate causes said substrate and said substrate elevator to engage said heated plate and partially liquefies the colorant thereby causing liquefied colorant to be absorbed into the substrate.

* * * * *